United States Patent
Manchanda et al.

(10) Patent No.: US 12,499,370 B2
(45) Date of Patent: Dec. 16, 2025

(54) SYSTEMS AND METHODS FOR DETERMINING EXPLAINABILITY OF MACHINE PREDICTED DECISIONS

(71) Applicant: Tata Consultancy Services Limited, Mumbai (IN)

(72) Inventors: Sanjeev Manchanda, Mumbai (IN); Shriram Pillai, Mumbai (IN); Mahesh Kshirsagar, Mumbai (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 862 days.

(21) Appl. No.: 17/806,032

(22) Filed: Jun. 8, 2022

(65) Prior Publication Data
US 2022/0405603 A1    Dec. 22, 2022

(30) Foreign Application Priority Data

Jun. 9, 2021  (IN) .............................. 202121025704

(51) Int. Cl.
*G06N 5/04* (2023.01)
*G06N 3/08* (2023.01)
(Continued)

(52) U.S. Cl.
CPC ............. *G06N 3/105* (2013.01); *G06N 3/084* (2013.01); *G06N 5/045* (2013.01)

(58) Field of Classification Search
CPC ..................................................... G06N 5/045
See application file for complete search history.

(56) References Cited

U.S. PATENT DOCUMENTS

2015/0142717 A1* 5/2015 Guiver .................. G06N 5/045
706/46
2019/0303404 A1  10/2019 Amer et al.
(Continued)

FOREIGN PATENT DOCUMENTS

CA          2979579 A1    9/2016

OTHER PUBLICATIONS

Campagner, Andrea, and Federico Cabitza. "Back to the feature: A neural-symbolic perspective on explainable AI." Machine Learning and Knowledge Extraction: 4th IFIP TC 5, TC 12, WG 8.4, WG 8.9, WG 12.9 International Cross-Domain Conference, CD-MAKE 2020, Dublin, Ireland, Aug. 25-28, 2020 (Year: 2020).*

(Continued)

*Primary Examiner* — Hal Schnee
(74) *Attorney, Agent, or Firm* — Finnegan, Henderson, Farabow, Garrett & Dunner, LLP

(57) ABSTRACT

This disclosure relates generally to system and method for determining explainability of machine predicted decisions. Typical explainable AI (XAI) solutions are limited by type of data processed, such as structured, semi-structured and unstructured text. In addition, due to limited automation of the process of explainability, typical systems are cumbersome and time-consuming. The system and method provide an end to end solution for automating the determination of explainability of machine predicted decisions. The XAI process output an absolute relevance score indicative of relevance of the features associated with the prediction which is indicative of percentage relevance/contribution of individual feature. The system further computes relative relevance score of the features by adding up all the features and calculating how much each individual feature is contributing to the total score. The relative relevance scores are (Continued)

utilized for determining explainability of decisions of the prediction.

6 Claims, 14 Drawing Sheets

(51) Int. Cl.
*G06N 3/084* (2023.01)
*G06N 3/10* (2006.01)
*G06N 5/045* (2023.01)

(56) References Cited

U.S. PATENT DOCUMENTS

2021/0174244 A1* 6/2021 Kursun ............... G06N 3/084
2021/0383275 A1* 12/2021 Miroshnikov .... G06F 18/24137
2022/0067541 A1* 3/2022 Blanchard ............ G06N 5/045

OTHER PUBLICATIONS

Jung, Yeon-Jee, Seung-Ho Han, and Ho-Jin Choi. "Explaining CNN and RNN using selective layer-wise relevance propagation." IEEE Access 9 (2021): 18670-18681. (Year: 2021).*
Bharadhwaj, Homanga. "Layer-wise relevance propagation for explainable deep learning based speech recognition." 2018 IEEE International symposium on signal processing and information technology (ISSPIT). IEEE, 2018. (Year: 2018).*
Dang, Shilpa, and Santanu Chaudhury. "Novel relative relevance score for estimating brain connectivity from fMRI data using an explainable neural network approach." Journal of Neuroscience Methods 326 (2019): 108371. (Year: 2019).*
Marcano-Cedeño, Alexis, et al. "Feature selection using sequential forward selection and classification applying artificial metaplasticity neural network." IECON 2010—36th annual conference on IEEE industrial electronics society. IEEE, 2010. (Year: 2010).*
Ullah, Hsan et al., "Explaining Deep Learning Models for Structured Data using Layer-Wise Relevance Propagation", Machine Learning—Computer Vision and Pattern Recognition, Date: Nov. 2020, Publisher: Arxiv, https://arxiv.org/ftp/arxiv/papers/2011/2011_13429.pdf.
Sánchez-Martínez, Sergio et al., "Machine Learning for Clinical Decision-Making: Challenges and Opportunities", Mathematics & Computer Science > Artificial Intelligence & Robotics, Date: Nov. 2019, Publisher: Preprints.org, https://www.researchgate.net/publication/337539513_Machine_Learning_for_Clinical_Decision-Making_Challenges_and_Opportunities/link/5e136fc686fdcc2837532a26/download.
Danilevsky, Marina et al., "A Survey of the State of Explainable AI for Natural Language Processing", Computation and Language—Artificial Intelligence—Machine Learning, Date: Oct. 2020, Publisher: Arxiv, https://arxiv.org/pdf/2010.00711.pdf.
Roscher, Ribana et al., "Explainable Machine Learning for Scientific Insights and Discoveries", IEEE Access, Date: Jan. 2020, vol. 8, pp. 42200-42216, Publisher: IEEE, https://ieeexplore.ieee.org/stamp/stamp.jsp?arnumber=9007737.
Meyer Lauritsen, Simon, et al., "Explainable artificial intelligence model to predict acute critical illness from electronic health records", Title of the item: Nature Communications—Article Date: Jan. 2020, vol. 8, pp. 42200-42216, Publisher: Nature.com, https://www.nature.com/articles/s41467-020-17431-x.pdf.

* cited by examiner

SYSTEMS AND METHODS FOR DETERMINING EXPLAINABILITY OF MACHINE PREDICTED DECISIONS

PRIORITY CLAIM

This U.S. patent application claims priority under 35 U.S.C. § 119 to: India Application No. 202121025704, filed on Jun. 9, 2021. The entire contents of the aforementioned application are incorporated herein by reference.

TECHNICAL FIELD

This disclosure relates generally to field of explainable artificial intelligence (AI), and more particularly to system and method for automatic and systematic determination of explainability for machine predicted decisions.

BACKGROUND

Explainable artificial intelligence (AI) or XAI refers to the form of AI in which results of solutions provided by AI systems can be understood by human beings. The XAI is in contrast with typical AI solutions, since in typical AI solutions, the machine leaning model is considered as a black box that does not offer insights into the decision being arrived at. The AI model lacks reasoning why it has ended with certain prediction or results, to overcome this the explainability of the machine learning model is necessary.

XAI, on the other hand, provides justification why the model has made certain decisions. It helps decision maker in identifying reasons behind decisions recommended by machine learning algorithms and facilitates justifications for decisions. XAI is of tremendous importance for critical decision areas where a slight change or marginal error may cause great impact to life or can incur losses, for instance, in the medical, pharma, financial domains.

XAI solutions developed earlier are limited by type of data processed, such as structured, semi-structured and unstructured text. In addition, due to limited automation of the process of explainability.

SUMMARY

Embodiments of the present disclosure present technological improvements as solutions to one or more of the above-mentioned technical problems recognized by the inventors in conventional systems. For example, in one embodiment, a method for determining explainability of machine predicted decisions is provided. The method includes receiving, via one or more hardware processors, an input data associated with a domain, the input data comprising one or more of textual data, structured data, unstructured data, and semi structured data. Further, the method includes processing, via the one or more hardware processors, the input data to obtain one or more predictions (PPREDICT) and a first set of features of respective data types of the input data. Furthermore, the method includes processing, via the one or more hardware processors, the first set of features through an automated XAI prediction process to generate an explainable model (MXAI) and explainable artificial intelligence (XAI) predictions (PXAI) in a plurality of iterations, wherein the automated XAI prediction process comprises training a deep neural network (DNN) model to compute relevance or contribution of each feature of the first set of features while generating the XAI predictions and the explainable model (MXAI). Herein, each iteration of the plurality of iterations comprises processing, in a forward pass, the input data through calculations based on weights of edges of the DNN generated through random number generators to predict an output; comparing the output predicted in the forward pass with an actual output obtained from the input data to obtain an error; and propagating back the error to update weights of edges in a backward pass, wherein propagating the error back facilitates in output prediction to be close to actual output by updating weights of edges in the DNN. Herein, the plurality of iterations are performed until a predetermined criteria associated with the error is met. Also, the method includes computing, in the backward pass, a relevance score based on the error value in the iteration when the predetermined criteria is met, the relevance score indicative of contribution of each feature from amongst the first set of features using a layerwise relevance propagation of the each feature, via the one or more hardware processors. The method further includes displaying, via the one or more hardware processors, the relevance score, the XAI output predictions and the XAI predictions on a user interface.

In another embodiment, a system for determining explainability of machine predicted decisions is provided. The system include a memory storing instructions; one or more communication interfaces; and one or more hardware processors coupled to the memory via the one or more communication interfaces, wherein the one or more hardware processors are configured by the instructions to receive an input data associated with a domain, the input data comprising one or more of textual data, structured data, unstructured data, and semi structured data. The one or more hardware processors are configured by the instructions to process the input data to obtain one or more predictions (PPREDICT) and a first set of features of respective data types of the input data. The one or more hardware processors are configured by the instructions to process the first set of features through an automated XAI prediction process to generate an explainable model (MXAI) and explainable artificial intelligence (XAI) predictions (PXAI) in a plurality of iterations, wherein the automated XAI prediction process comprises training a deep neural network (DNN) model to compute relevance or contribution of each feature of the first set of features while generating the XAI predictions and the explainable model (MXAI). To perform each iteration of the plurality of iterations, the one or more hardware processors are configured by the instructions to process, in a forward pass, the input data through calculations based on weights of edges of the DNN generated through random number generators to predict an output; compare the output predicted in the forward pass with an actual output obtained from the input data to obtain an error; propagate back the error to update weights of edges in a backward pass, wherein propagating the error back facilitates in output prediction to be close to actual output by updating weights of edges in the DNN. Herein, the plurality of iterations are performed until a predetermined criteria associated with the error is met. The one or more hardware processors are configured by the instructions to compute, in the backward pass, a relevance score based on the error value in the iteration when the predetermined criteria is met, the relevance score indicative of contribution of each feature from amongst the first set of features using a layerwise relevance propagation of the each feature; and display the relevance score, the XAI output predictions and the XAI predictions on a user interface.

In yet another aspect, there are provided one or more non-transitory machine-readable information storage mediums comprising one or more instructions which when executed by one or more hardware processors cause receiving, via one or more hardware processors, an input data associated with a domain, the input data comprising one or more of textual data, structured data, unstructured data, and semi structured data. Further, the method includes processing, via the one or more hardware processors, the input data to obtain one or more predictions (PPREDICT) and a first set of features of respective data types of the input data. Furthermore, the method includes processing, via the one or more hardware processors, the first set of features through an automated XAI prediction process to generate an explainable model (MXAI) and explainable artificial intelligence (XAI) predictions (PXAI) in a plurality of iterations, wherein the automated XAI prediction process comprises training a deep neural network (DNN) model to compute relevance or contribution of each feature of the first set of features while generating the XAI predictions and the explainable model (MXAI). Herein, each iteration of the plurality of iterations comprises processing, in a forward pass, the input data through calculations based on weights of edges of the DNN generated through random number generators to predict an output; comparing the output predicted in the forward pass with an actual output obtained from the input data to obtain an error; and propagating back the error to update weights of edges in a backward pass, wherein propagating the error back facilitates in output prediction to be close to actual output by updating weights of edges in the DNN. Herein, the plurality of iterations are performed until a predetermined criteria associated with the error is met. Also, the method includes computing, in the backward pass, a relevance score based on the error value in the iteration when the predetermined criteria is met, the relevance score indicative of contribution of each feature from amongst the first set of features using a layerwise relevance propagation of the each feature, via the one or more hardware processors. The method further includes displaying, via the one or more hardware processors, the relevance score, the XAI output predictions and the XAI predictions on a user interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
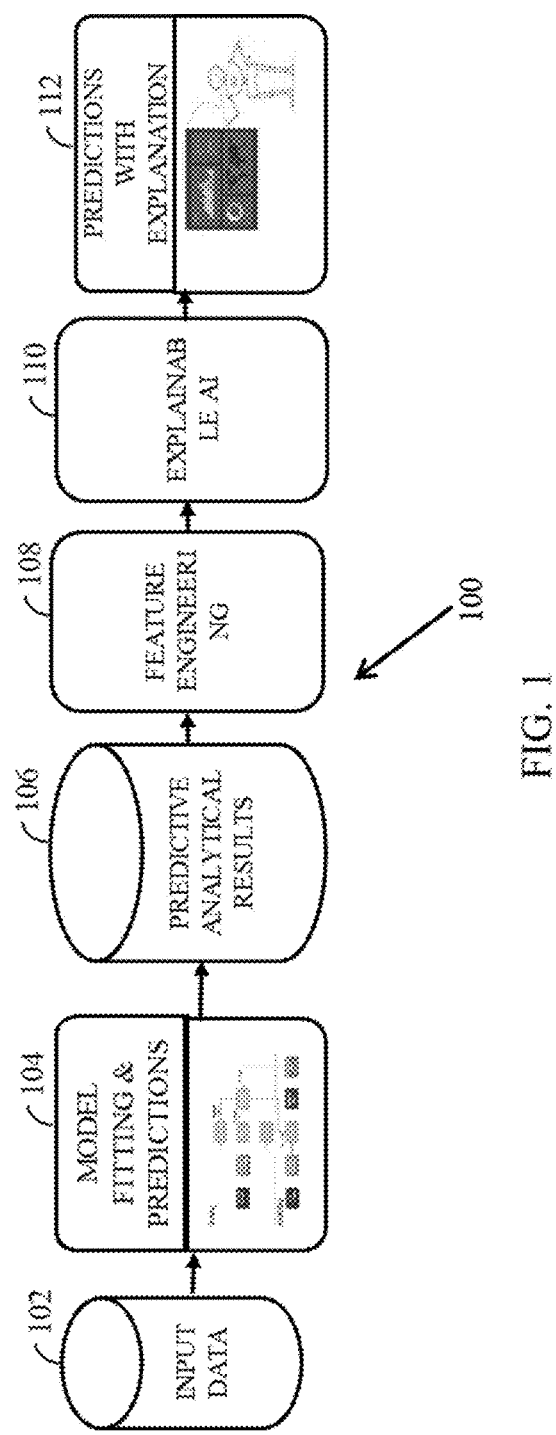
FIG. 1 illustrates a generic application flow of an explainable artificial intelligence (XAI) system.

FIG. 1 illustrates a generic application flow of an Explainable artificial intelligence (XAI) system 100. The XAI system 100 accepts input data 102, comprising, for example, a structured data, semi-structured data and unstructured data. A deep learning model is trained on the input data and further the accuracy of the DL model is stored and/or displayed. Using feature engineering, the features of the text data are built, and these features are stored in a file. A Long Short Term Memory (LSTM) deep learning model is trained on the generated features and the model accuracy is determined. The output is predicted by the LSTM model. Explainable AI facilitates in predicting the basis on which the LSTM deep learning model predicted the output.

There are multiple conventional XAI models available, however, getting an appropriate algorithm is a challenge. Additionally, conventionally various activities such as selecting algorithm, optimizing hyperparameters and features engineering are performed manually, thereby making the process slow.

In an embodiment, the disclosed system and method utilizes a customized layerwise relevance propagation algorithm for Explainability. The disclosed method also facilitates in automating the aforementioned activities such as selecting algorithm, optimizing hyperparameters and end to end features engineering. Automation of these tasks involve huge corpus for training, hence the disclosed method includes creating a customized corpus to meet requisite quality XAI output. For providing explanation to the generated output, the disclosed system utilizes customized explainability using relevance or contribution calculation. This customized process gives weightage to each word or relevance's to explain the prediction of LSTM deep learning model.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 13, where similar reference characters denote corresponding features consistently throughout the figures, there are shown preferred embodiments and these embodiments are described in the context of the following exemplary system and/or method.

Figure 2:
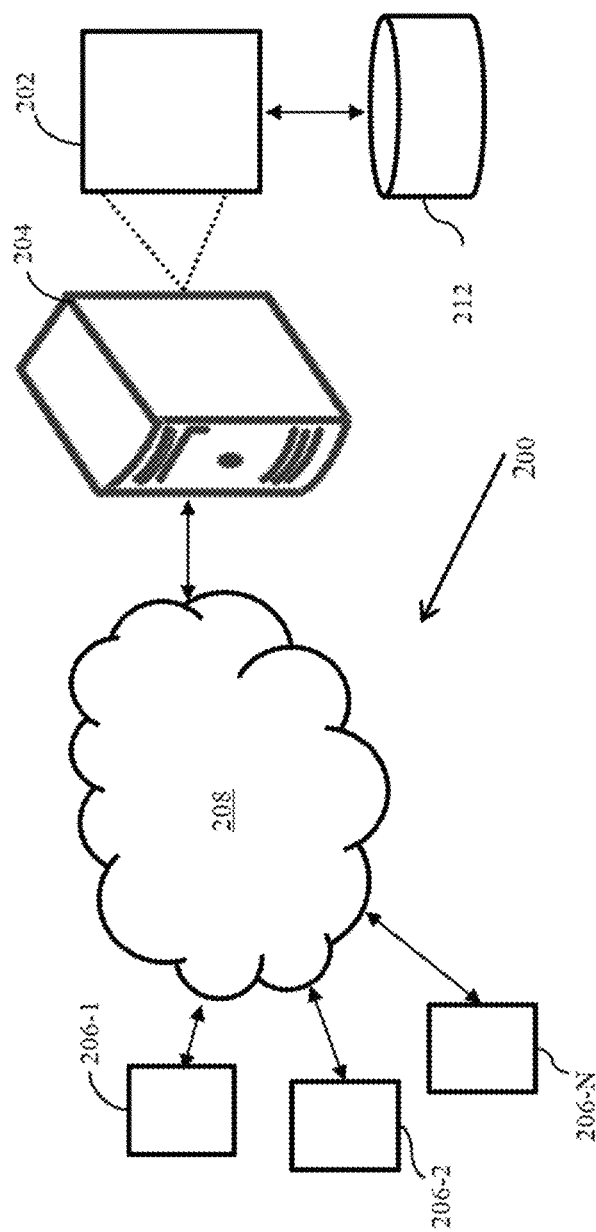
FIG. 2 illustrates a network diagram for a system for determining explainability for machine predicted decisions according to some embodiments of the present disclosure.

FIG. 2 illustrates an example network implementation 200 of a system 202 for determining explainability for machine predicted decisions, in accordance with an example embodiment. Explainable AI aims to open the black box of the machine learning and deep learning model. It is typically assumed that the model predictions are correct but there may be chances that model prediction may go wrong, as there is no any concrete explanation that the model prediction is absolutely right. To open up the black box of such model predictions and provide explanation to the model prediction, Explainable AI (XAI) is introduced. XAI gives appropriate explanation to the predicted output as to the factors/features based on which the model has predicted the respective output. The disclosed system 202 is capable of automatically generating relevance of all features for decisions.

In an embodiment, the system 202 receives an input data associated with a problem. The problem may be for instance, a classification problem. The system 202 automatically analyses the input data which may be structured data, unstructured data, semi-structured data or a combination thereof. The system 202 automatically identifies the model and hyperparameters, and further generates predictions on whole input data. The system automatically creates features from structured and unstructured data, and generating relevance of all of the features for decisions made.

Although the present disclosure is explained considering that the system 202 is implemented on a server, it may be understood that the system 202 may also be implemented in a variety of computing systems 204, such as a laptop computer, a desktop computer, a notebook, a workstation, a cloud-based computing environment and the like. It will be understood that the system 202 may be accessed through one or more devices 206-1, 206-2 . . . 206-N, collectively referred to as devices 206 hereinafter, or applications residing on the devices 206. Examples of the devices 206 may include, but are not limited to, a portable computer, a personal digital assistant, a handheld device, a smartphone, a tablet computer, a workstation and the like. The devices 206 are communicatively coupled to the system 202 through a network 208.

In an embodiment, the network 208 may be a wireless or a wired network, or a combination thereof. In an example, the network 208 can be implemented as a computer network, as one of the different types of networks, such as virtual private network (VPN), intranet, local area network (LAN), wide area network (WAN), the internet, and such. The network 206 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 208 may include a variety of network devices, including routers, bridges, servers, computing devices, storage devices. The network devices within the network 208 may interact with the system 102 through communication links.

As discussed above, the system 202 may be implemented in a computing device 204, such as a hand-held device, a laptop or other portable computer, a tablet computer, a mobile phone, a PDA, a smartphone, and a desktop computer. The system 202 may also be implemented in a workstation, a mainframe computer, a server, and a network server. In an embodiment, the system 202 may be coupled to a data repository, for example, a repository 212. The repository 212 may store data processed, received, and generated by the system 202. In an alternate embodiment, the system 202 may include the data repository 212.

The network implementation 200 supports various connectivity options such as BLUETOOTH®, USB, ZigBee and other cellular services. The network environment enables connection of devices 206 such as Smartphone with the server 204, and accordingly with the database 212 using any communication link including Internet, WAN, MAN, and so on. In an exemplary embodiment, the system 202 is implemented to operate as a stand-alone device. In another embodiment, the system 202 may be implemented to work as a loosely coupled device to a smart computing environment.

Figure 3:
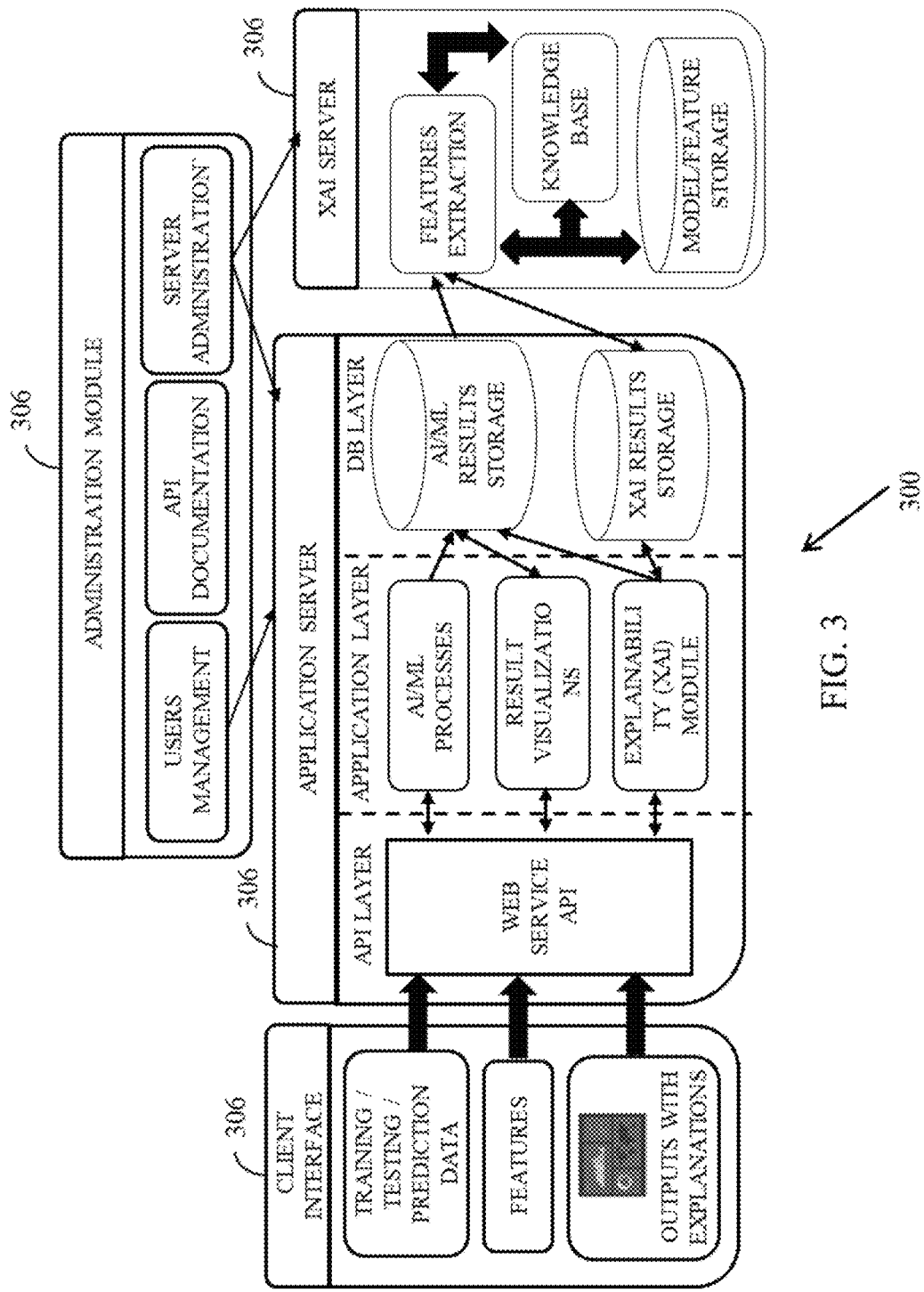
FIG. 3 illustrates an architecture of an Explainable AI (XAI) system in accordance with an example embodiment.

FIG. 3 illustrates an architecture of explainable AI (XAI) system in accordance with an example embodiment. The explainable AI system may be an example of the system 200 (FIG. 2) and may hereinafter be referred to as system 300. The system 300 includes modules namely, an application server module 302, an intelligence server module 304, an administrative module 306 and a client devices module 308. The application server module 302 is responsible for receiving requests for explainability from users. The application server module 302 is also responsible for accepting input data (for instance, training data while creating the model and prediction data in a production environment). The input data may include documents, files, and data in such structured, unstructured or semi-structured format. The intelligence server module 304 is responsible for performing feature engineering on the input data, and features are extracted. The extracted features are stored in a model (for instance in a csv file format), and the model is trained using deep learning using LSTM and the prediction model is created. The prediction model is passed through the Explainable AI (XAI) system to facilitate explainability of each decision based on system generated and human understandable features. The XAI system and the process followed by the XAI system is described further with reference to FIG. 4 in detail.

The XAI process or the method followed at the XAI system includes a data ingestion process, prediction process, feature engineering process, XAI prediction process and XAI relevance process. The data ingestion process includes receiving input data to train, test and provide predictions through automated machine learning algorithms. As described previously, the input data may include structured data, unstructured data, semi-structured data, and combinations thereof. During the data ingestion process, the disclosed system identifies properties of the input data with basic details of the problem (for instance, a classification problem) to be solved. For example, for instance a class labels column. Herein, the system may be provided with input data containing the information, such as, what type of problem is to be solved that is identifying classification label column. In an embodiment, such information may be provided by a user. For instance, the user may enter a classification problem, and also provide information regarding the class column (dependent column) to be used for such a problem. Herein, it is to be understood that the output (from the prediction model) may already be known, and hence the user may know the column that is to be used for the training during XAI process. Such an output (or the column) may be a dependent column, while other columns in the input data may be independent columns. At different times, the user may wish to use different columns as classification problem, so user may provide information regarding the columns to be used as the dependent column. Based on such information, rest of the processing is done by the system, e.g. in the input data, an identification of the dependent and independent columns is sufficient to process end to end process further automatically. In an embodiment, the system may be capable of performing data characterization of the input data based on the problem. For instance, the system may identify last column as the predicted/dependent column and rest other columns as independent columns.

Once data source comprising the input data is connected with XAI system with an information about classification label attribute obtained from the data ingestion process, the prediction process automatically identifies the data type and data characteristics to process the input data further. The prediction process is explained further with reference to FIG. 4.

The administration module 306 is responsible for administering application user management and application/intelligence server management. The client devices module 308 creates workflows for running the deep learning model on the input data and presenting the output.

Figure 4:
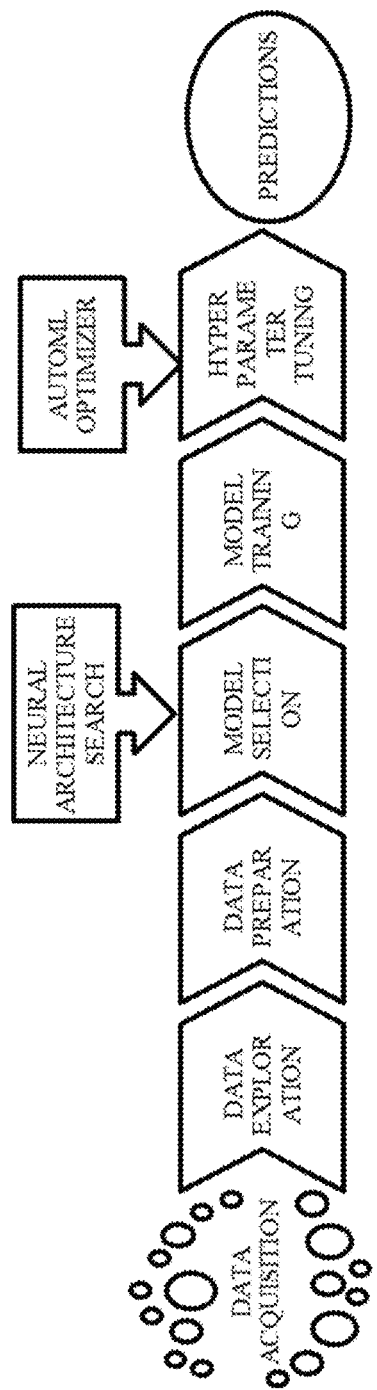
FIG. 4 illustrates an example process flow of XAI process in accordance with an example embodiment.
Figure 5:
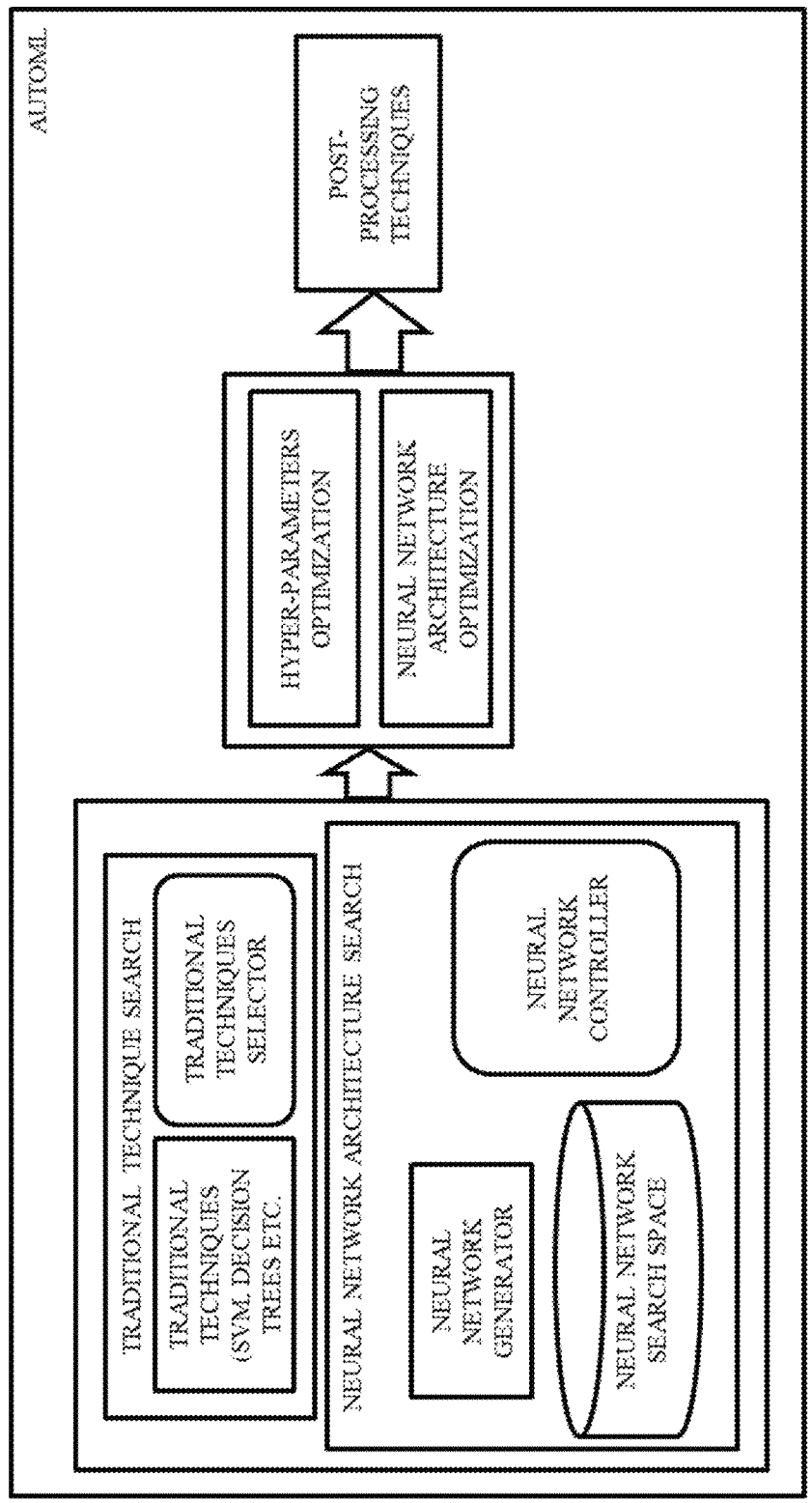
FIG. 5 illustrates an example of AutoML process generating predictions from the input data, in accordance with an example embodiment.

FIG. 4 depicts the prediction process of generating predictions from the input data, in accordance with an example embodiment. In an example embodiment, a Neural Architecture Search (NAS) and AutoML may facilitate in determining neural network for the input data and AutoML optimizer facilitates optimized hyperparameters of neural network. NAS intelligently defines number of layers and nodes in each layer of deep learning neural network that is needed for generating predictions. The AutoML process is illustrated in FIG. 5. As illustrated in FIG. 5, the AutoML process identifies appropriate machine learning model, optimizes the identified model and then helps in post-processing of the outputs. The AutoML process utilizes predictions module as a benchmark in identifying and extracting features. Extracted features need to be rich enough to represent the entire population of the input data, so that explain-ability can be ensured to be closest possible to reality.

Figure 6A:
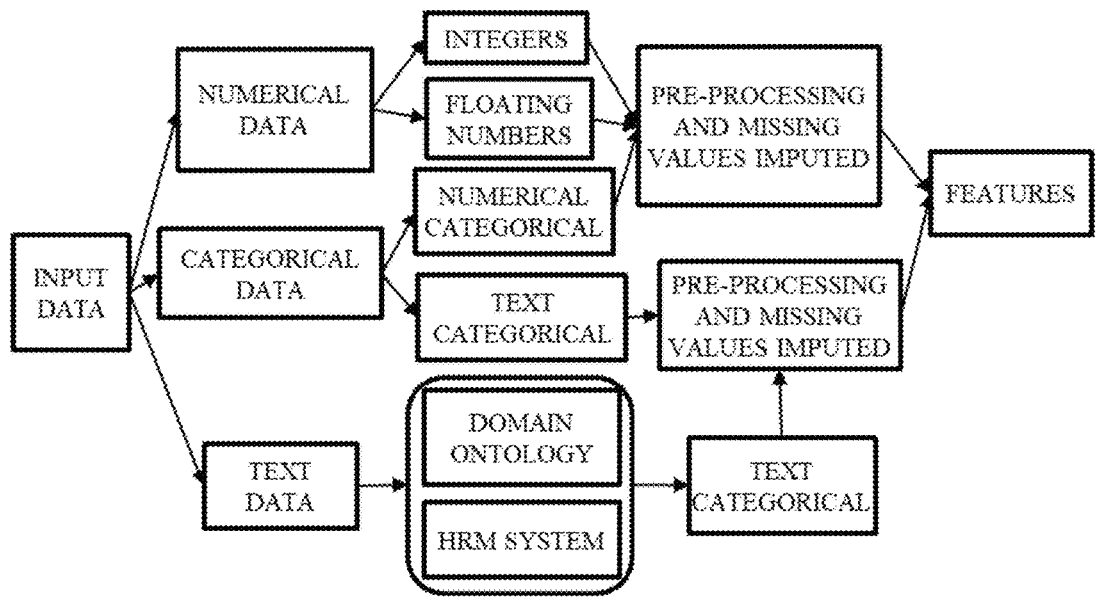
FIG. 6A illustrates an example process flow for automated feature engineering in, in accordance with an example embodiment
Figure 6B:
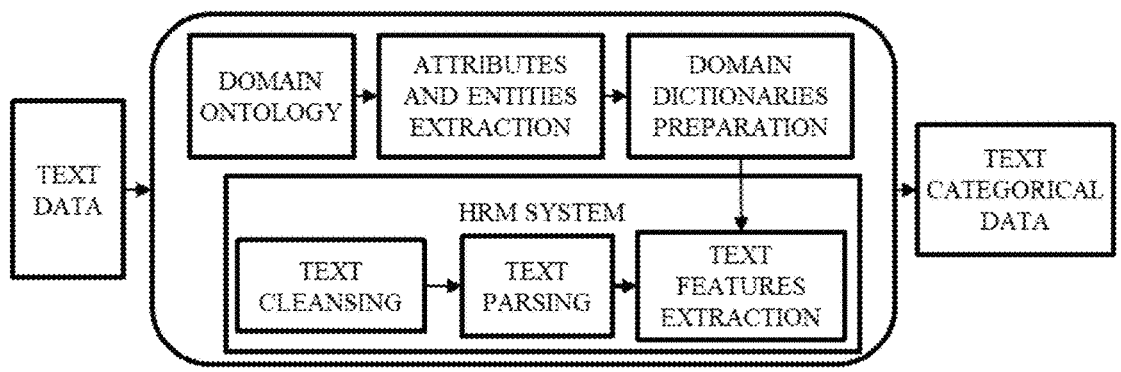
FIG. 6B illustrates an example process flow for automated unstructured text feature engineering, in accordance with an example embodiment.
Figure 6C:
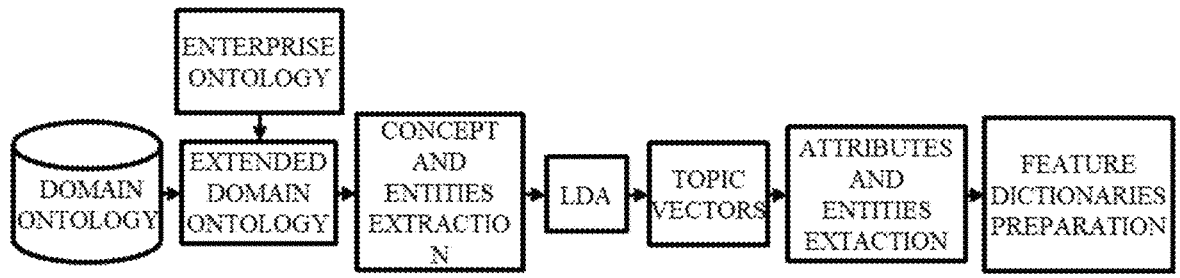
FIG. 6C illustrates an example of a process flow for automatic preparation of feature dictionaries using the domain ontology and (optionally) enterprise ontology, in accordance with an example embodiment.
Figure 7:
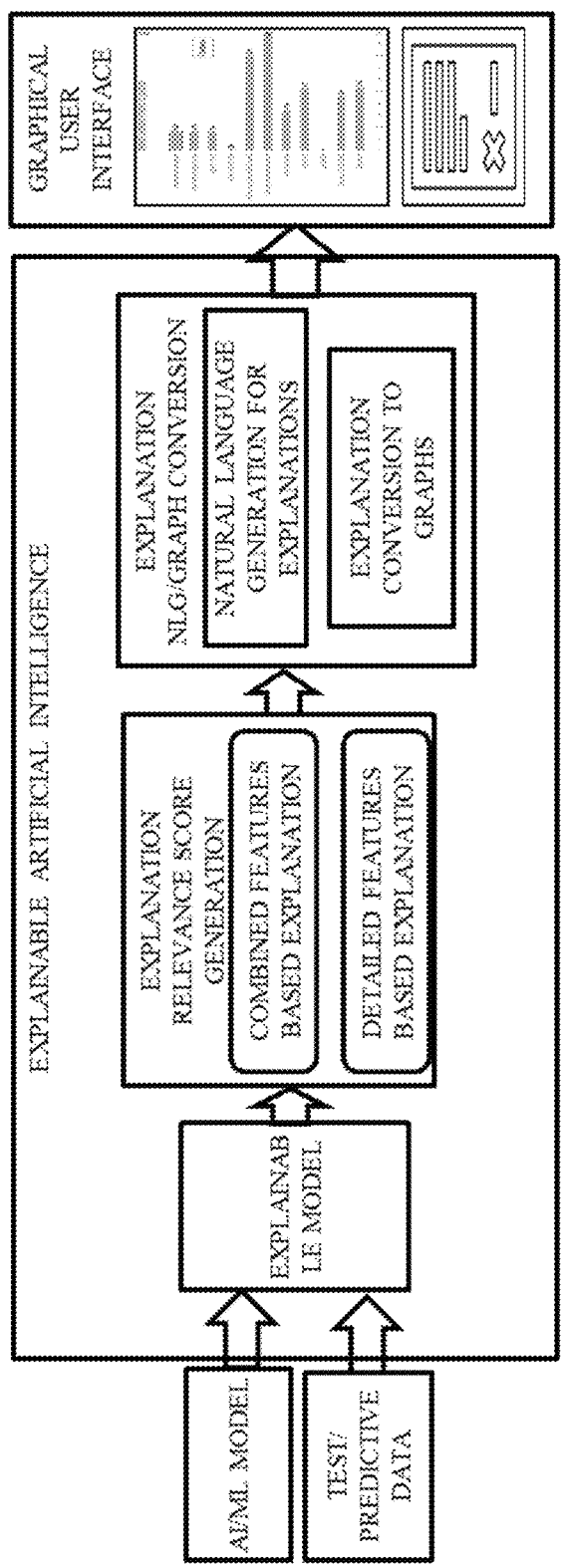
FIG. 7 depicts explainable artificial intelligence process, where generated model and data is used to create explainable model in accordance with some embodiments of the present disclosure.

The prediction process is followed by a feature engineering process. The feature engineering process facilitates in extracting features from the input data automatically. During the feature engineering process, the type of data and features from the data are extracted. The features may include text features, categorical features and numerical features. The text features may be extracted by using conventional text feature extraction techniques, whereas categorical and numerical features may be prepared from the input data through feature preprocessing as depicted in FIGS. 6A, 6B and 6C. For example, as depicted in FIG. 6A, the input data may include numerical data, categorical data and text data. The numerical data such as integers and floating numbers may be preprocessed and missing values may be input therein by the system to identify features therefrom. Similarly, the categorical data including the numerical categorical data and the text categorical data may be preprocessed and missing values may be input therein by the system to identify features therefrom. For extracting features from the unstructured data such as text data, a domain ontology may be created or accessed, as illustrated in FIG. 6B. The domain ontology may facilitate in identifying the possible features attributes and corresponding entity values for the input data which may be utilized for preparation of feature dictionaries. The process of preparation of feature dictionaries is described with reference to FIG. 6C.

As previously mentioned, for processing the unstructured text data, there is a need to create features. Herein, domain ontology is used to create features from the unstructured data. Domain ontology identifies the kind of classes that are present in a particular domain (associated with the problem) and the properties that are present. Based on the classes and the properties, the system may identify the categories of the features from the domain ontology.

Referring to FIG. 6C, automatic preparation of feature dictionaries using the domain ontology and (optionally) enterprise ontology is described. The domain ontology along with an enterprise ontology may be utilized for creating an extended domain ontology. For example, consider a sentence "wall of semi-construction having thickness of 5 mm". Herein, the text data is cleaned and parsed to extract text features therefrom by the system. The disclosed system automates the process of feature engineering by identifying properties of data using the domain ontology. The system may further identify the classes and the properties of the input data, and categories of the features and creates a dictionary. From the dictionary/ontology, it may be identified that there is something called 'wall' or wall of semi-construction. The domain ontology may tell that there are classes with respect to the 'wall' as well as other features of 'semi-construction'. The disclosed system takes the word 'wall' and finds matching words in the dictionary created with the help of domain ontology. Then, the system outputs a response/category indicative of available of a matching word, and it may match the term 'wall' to that category to thereby, creating suitable features for XAI processing.

In an embodiment, the disclosed system iteratively evolves the features through benchmarking results of prediction process. For example, the input data (e.g., test data) may comprise multitude of features, and all the features may not be relevant for the prediction. The system takes different kinds of features with the help of domain ontology. Further, the system may check and rank all the features using for instance natural language toolkit (NLTK) algorithm. The NLTK algorithm ranks the features based on importance taking into consideration the weightage of each word within that domain words. Out of the total features, the system may take most important features (based on the ranking), so if that matches with the predefined accuracy, then those features are considered for further analysis. Else, the system may take lower ranking features as well.

As described, during the XAI prediction process, the input data is processed to generate predictions based on the features generated during feature engineering process above, for explain-ability. The system identifies features in the input data and these features are then used for predictions. A difference between the prediction analytical results (obtained by a predictions module) and XAI predictions ($P_{XAI}$) (obtained by a XAI predictions module) is that prediction module predicts based on whole input data, whereas XAI prediction module predicts through features extracted to calculate relevance or contributions. During the XAI prediction process, the system calculates relevance scores or contributions of each feature. In an embodiment, XAI system processes each feature to calculate relevance or contribution of each feature while generating XAI predictions. Herein, there are two types of relevance scores—absolute relevance score and relative relevance scores. The absolute relevance score indicates individual contribution of each feature out of 100% maximum, whereas the relative scores are calculated from absolute relevance scores where total sum of all features is 100% and individual feature score indicates score relative to other features. The absolute relevance score is calculated through techniques like SHapley Additive exPlanations (SHAP), Lime and LRP etc.

An important contribution of the disclosed embodiments is that the system determines the type of the input data and kind of algorithm being used. Based on the type of input data and the kind of algorithm, the system determines the explainability calculations. For example, for a prediction with the help of DL model, the system utilizes SHAP algorithm to find out the explainability value for it. For text prediction, the system uses Lime algorithm. The system identifies the kind of prediction model that can be used on the data, and based on that, the system selects algorithm for explainability. The XAI algorithm outputs only one score which is indicative of relevance of all the features. This is absolute relevance, means thereby individual feature—out of 100% how much it is contributing. Then, the system takes the absolute relevance score as output and calculate relative relevance score as well. The system adds up all the relative relevance scores and see how much each feature is contributing. So the absolute relevance score is given by the algorithm. The relative relevance score is calculated by adding up all the features and calculating how much each individual feature is contributing to the total score (out of total of 100%).

Figure 8:
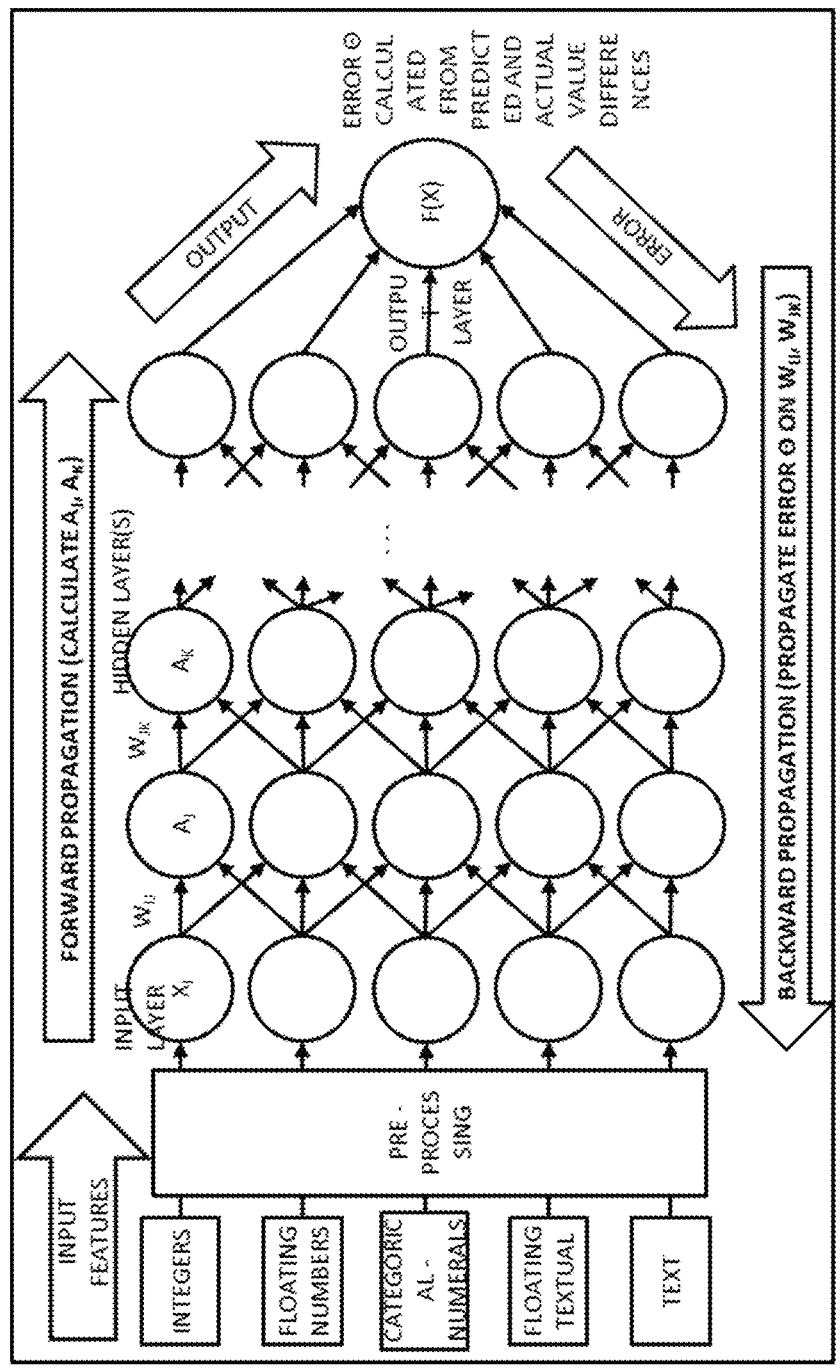
FIG. 8 depicts training of the deep neural network for explainable AI process in accordance with an example embodiment.
Figure 9:
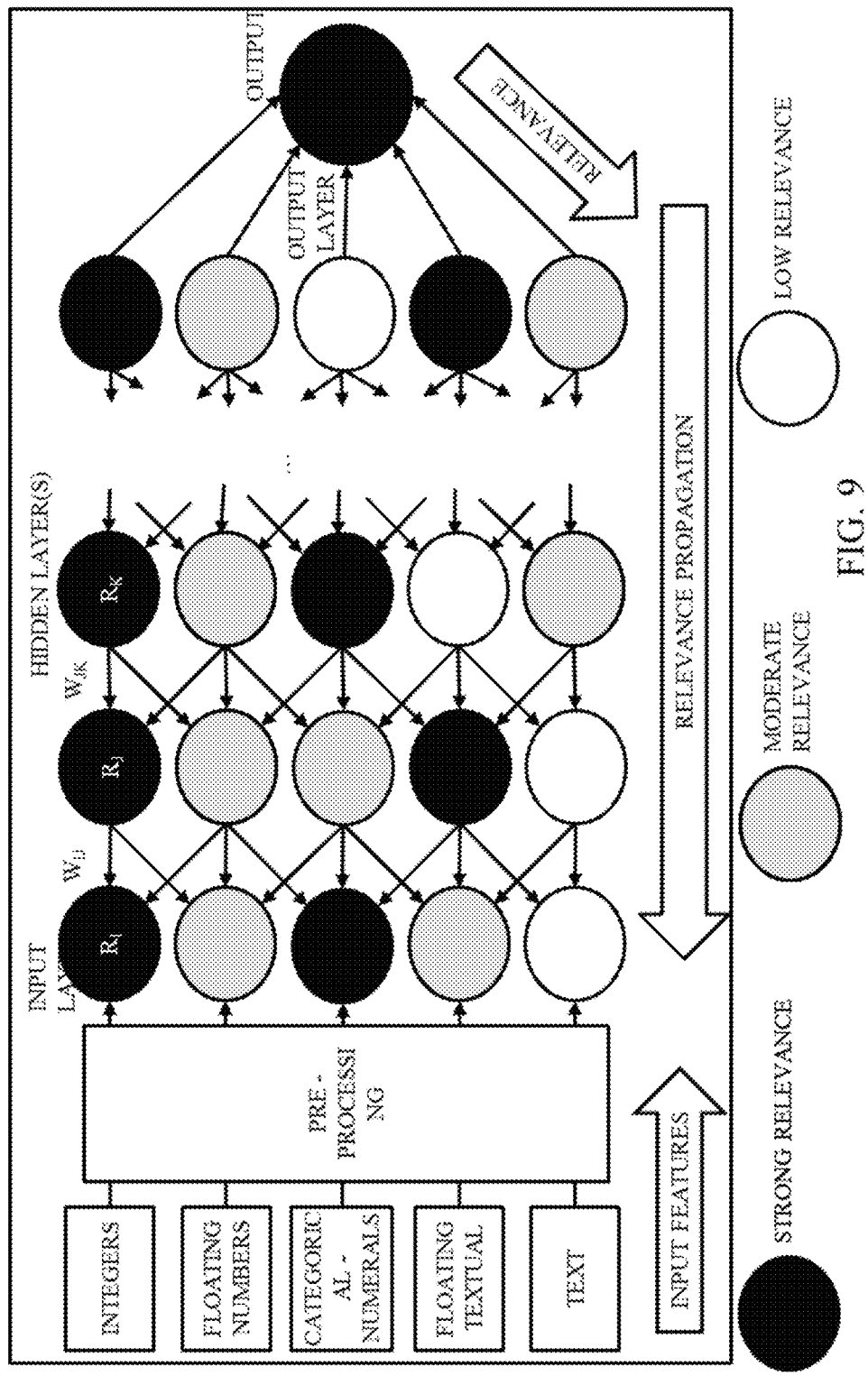
FIG. 9 depicts Layerwise Relevance Propagation for calculating relevance as backward pass to ensure relevance of each feature in XAI process in accordance with some embodiments of the present disclosure.
Figure 10A:
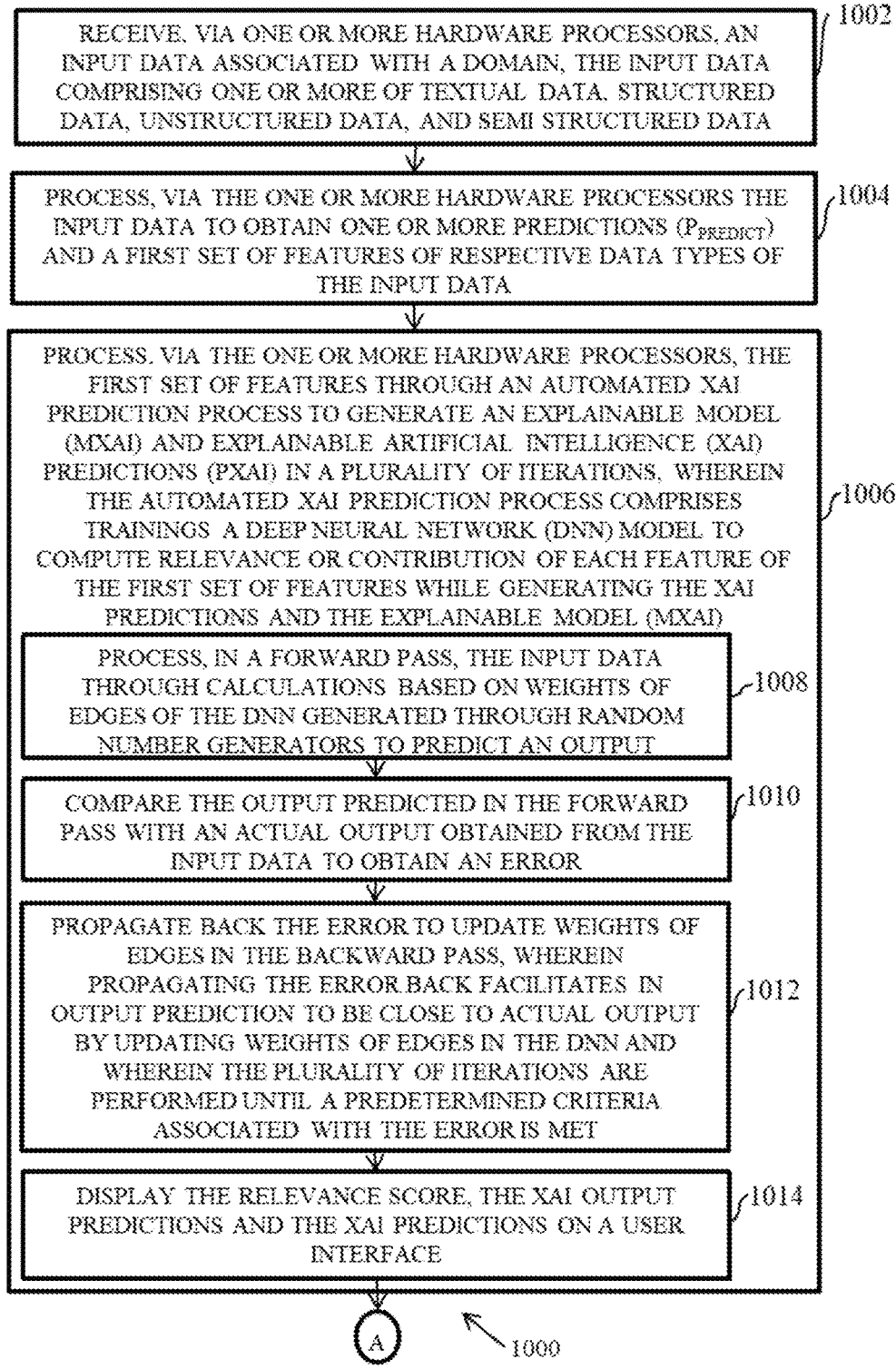
FIGS. 10A-10B illustrates an example flow chart of a method for determining explainability of machine predicted decisions, in accordance with an example embodiment.
Figure 10B:
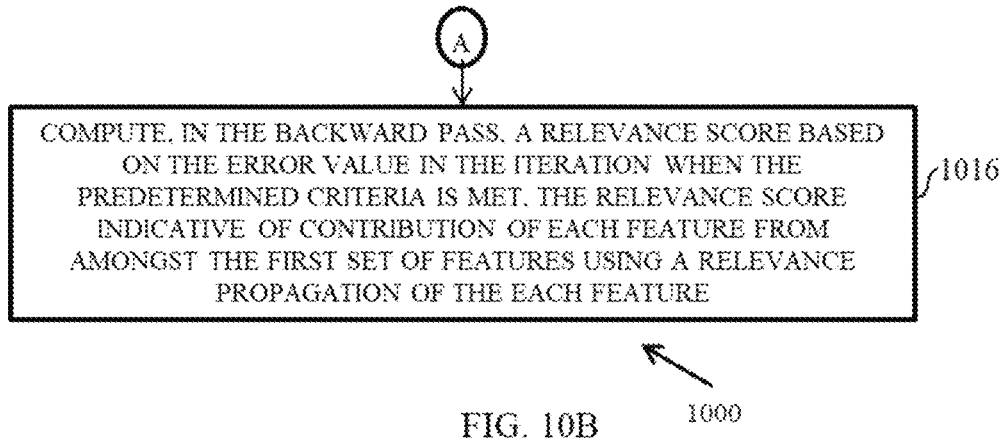
Figure 11:
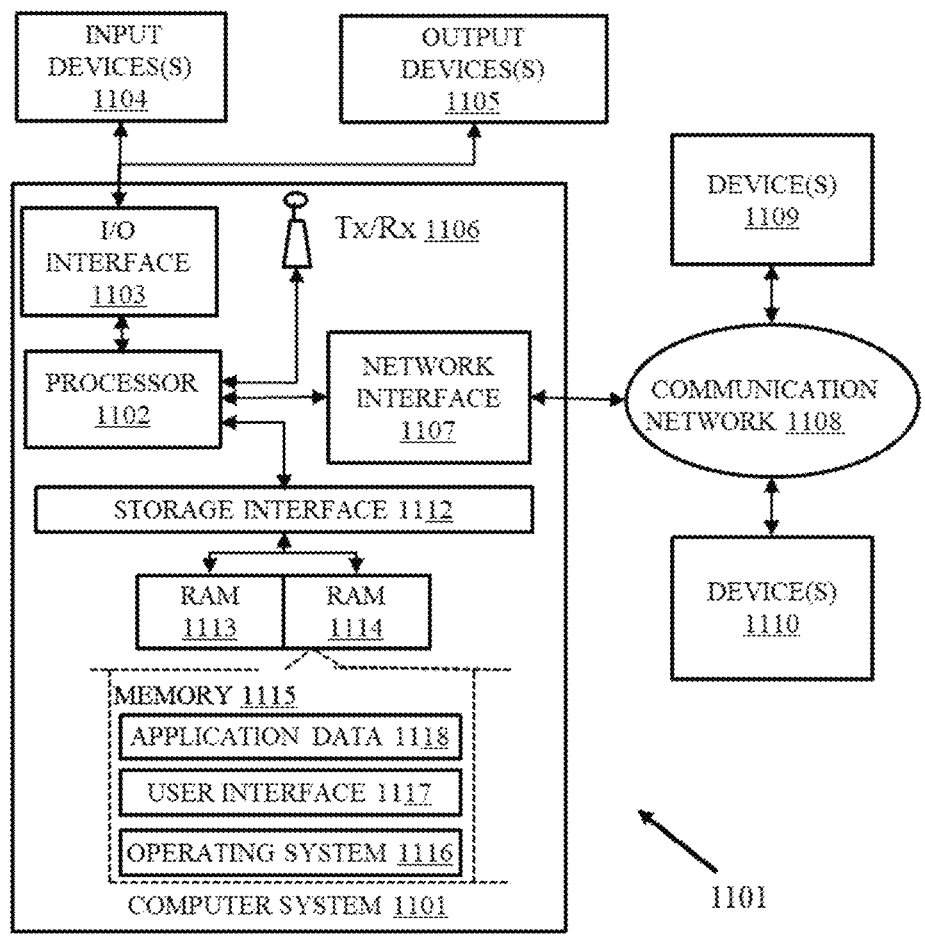
FIG. 11 is a block diagram of an exemplary computer system for implementing embodiments consistent with the present disclosure.
Figure 12A:
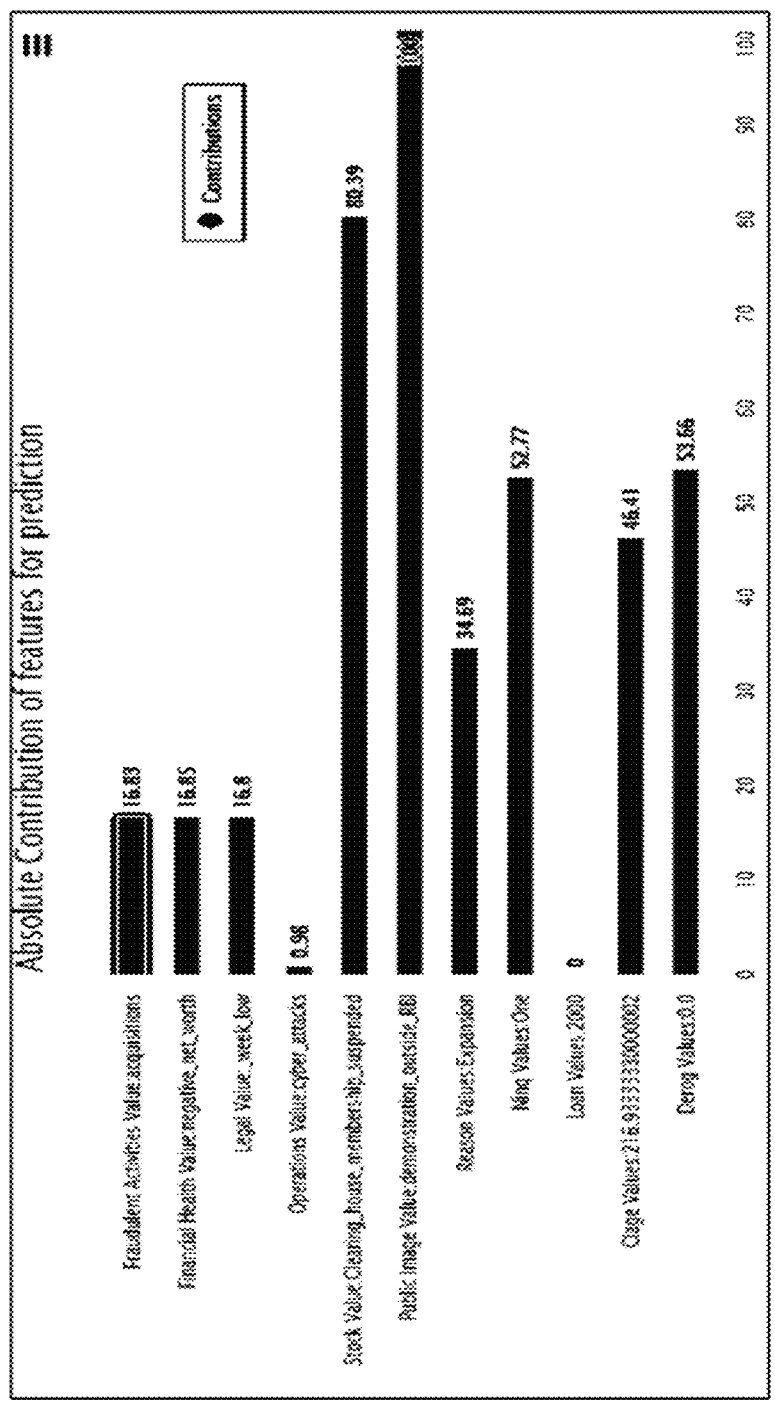
FIGS. 12A-12B illustrate example results of the disclosed system for an example scenario.
Figure 12B:
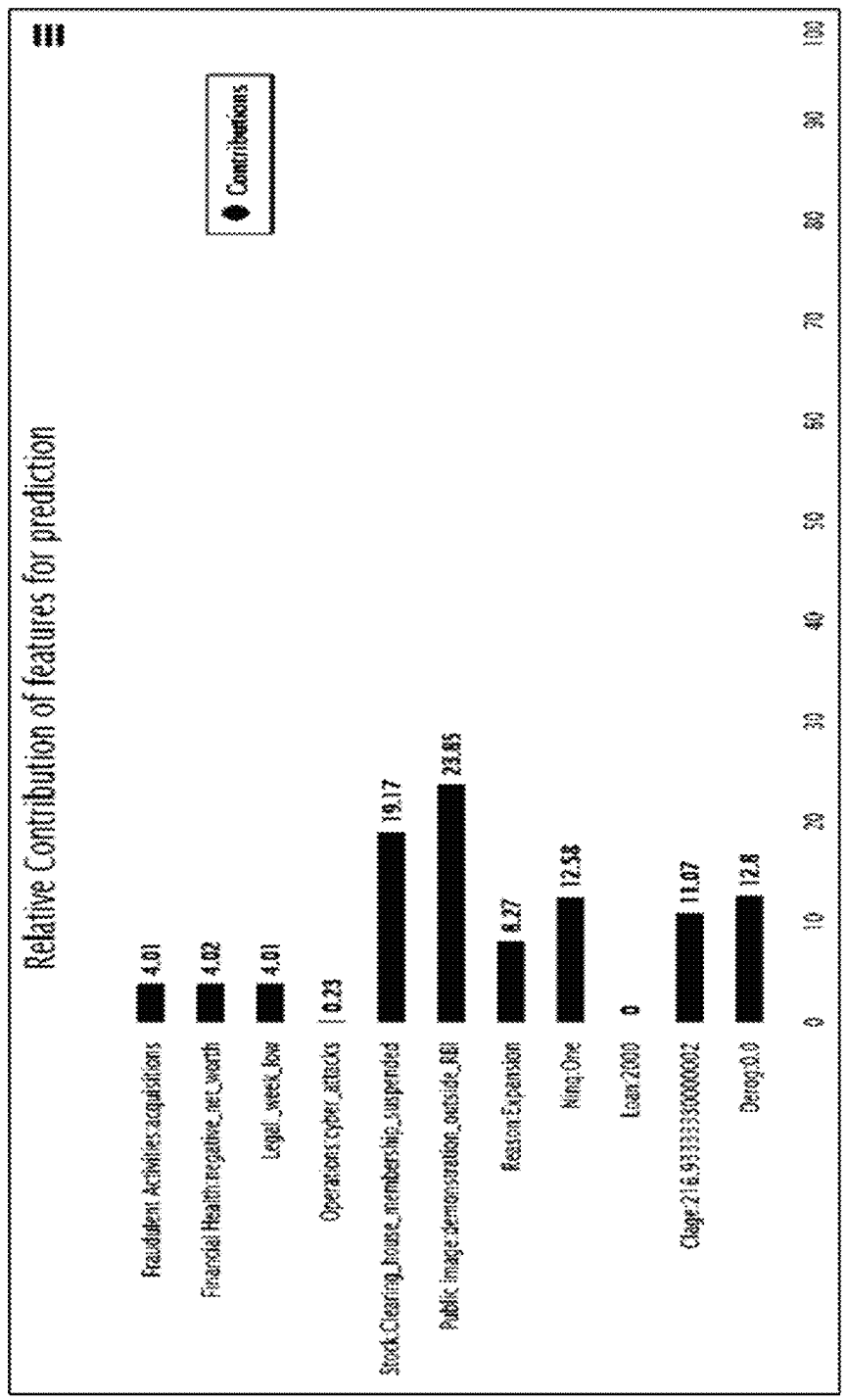
Figure 13:
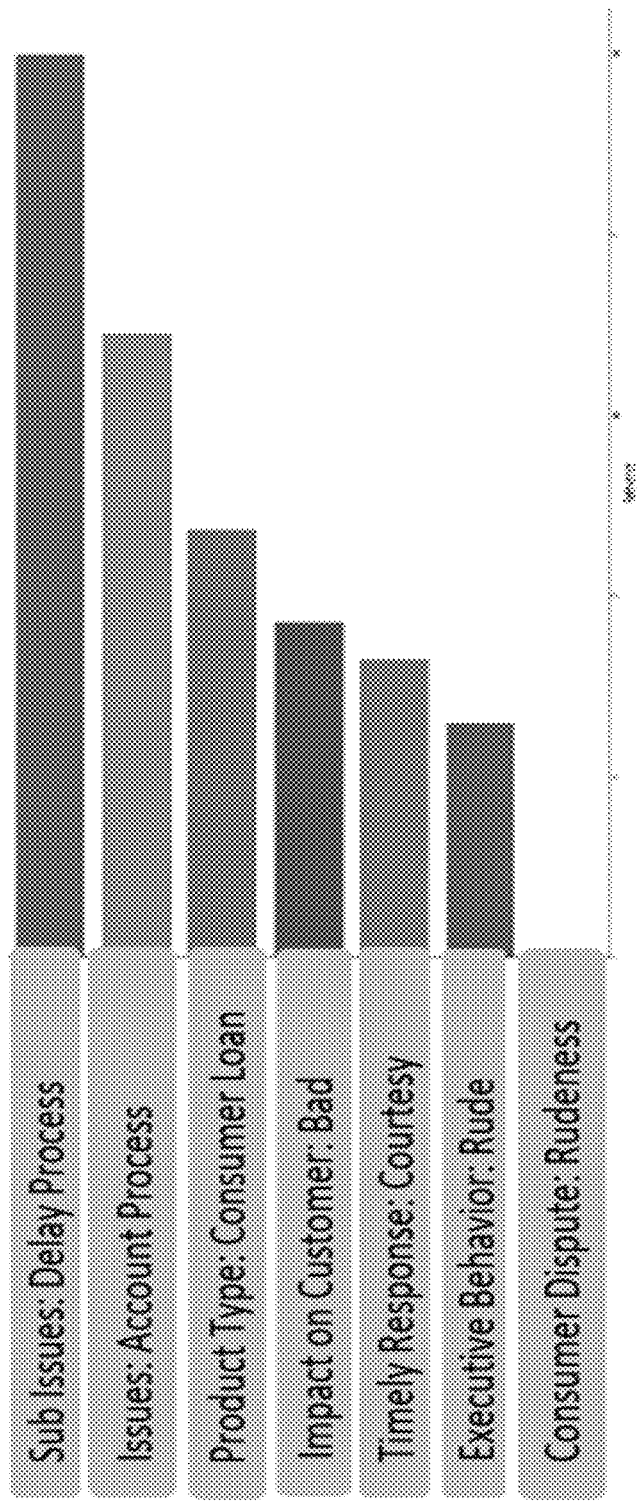
FIG. 13 illustrates example results of the disclosed system for another example scenario.

As this process is automated from end to end, so this system optimizes its predictions and relevance/contributions iteratively. FIGS. 8 and 9 depict explainable artificial intelligence process, where generated model and data is used to create explainable model ($M_{XAI}$), which generates combined relevance scores (absolute relevance scores) as well as individual row-based relevance score (relative relevance scores) calculation. FIGS. 10A-10B illustrates a flow-diagram depicting an end to end process for relevance scores generation in accordance with an example embodiment of the present disclosure.

Referring to FIGS. 8 and 9, training of a deep neural network through two passes viz. forward pass and backward pass in a plurality of iterations is illustrated. As seen from FIG. 8, in each iteration, the input data is processed in the forward pass through calculations based on weights of edges of the DNN generated through random number generators to predict an output. The predicted output is compared with actual output to calculate/obtain an error 8. The error 8 is then propagated back to update weights of edges in backward pass. In the subsequent iterations of the training data, the process is repeated with updated weights of the network (DNN) to reduce the error. With iterations of the training data, the neural network model learns iteratively, whereas the testing of model confirms about status of learning with metrics. In an embodiment, the iterations are performed until a predetermined criteria associated with the error is met.

In an embodiment, on determination that the predetermined criteria is not met, the system enhances the first set of features in the subsequent iterations of the plurality of iterations to obtain a second set of features, and processes the second set of features through the automated XAI prediction process to generate the explainable model ($M_{XAI}$) and the explainable artificial intelligence (XAI) predictions ($P_{XAI}$) until the predetermined criteria is met.

In the backward pass, a relevance score based on the error value is computed in the iteration when the predetermined criteria is met. The relevance score is indicative of contribution of each feature from amongst the first set of features using a layerwise relevance propagation of each feature, as illustrated in FIG. 9. The relevance formulae are used to calculate relevance as backward pass to ensure contribution of each feature. The darker the color of the node in FIG. 9, more relevant is the feature. FIGS. 10A-10B illustrates a flow-diagram depicting an end to end process for relevance scores generation in accordance with an example embodiment of the present disclosure.

Referring to FIGS. 10A-10B, a flow-diagram of a method for relevance scores generation for determining explainability of machine predicted decisions in accordance with an example embodiment of the present disclosure. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 1000 are described with help of system 202. However, the operations of the method 1000 can be described and/or practiced by using any other system.

At 1002, the method 1000 includes receiving an input data associated with a domain. The input data may include input training and test data ($I_{TRAIN}$, $I_{TEST}$) in form of one or more of textual data, structured data, unstructured data, and semi structured data.

At 1004, the method 1000 includes processing the input data to obtain one or more predictions ($P_{PREDICT}$) and a first set of features of respective data types of the input data.

$$P_{PREDICT} \leftarrow \text{PredictionProcess}(I_{TRAIN}, I_{TEST}) \quad (1)$$

Then Input data is processed to generate features ($F_{TRAIN}$, $F_{TEST}$) of respective data types automatically as explained in FIGS. 6A-6C. Initially finite set of text based features is generated that can be further enhanced as per need.

$$F_{TRAIN}, F_{TEST} \leftarrow \text{FeatUreEngineering}((I_{TRAIN}, I_{TEST})) \quad (2)$$

At 1006, the method 1000 includes processing the first set of features through an automated XAI prediction process to generate an explainable model ($M_{XAI}$) and explainable artificial intelligence (XAI) predictions ($P_{XAI}$) in a plurality of iterations. Herein, it will be noted that the automated XAI prediction process that generates best suited model ($M_{XAI}$) associated with the input data and the corresponding features (i.e. the first set of features). For example, for a prediction with the help of DL model, the system utilizes SHAP algorithm to find out the explainability value for it. For text prediction, the system uses Lime algorithm. The system identifies the kind of prediction model that can be used on the data, and based on that, the system selects algorithm or the model ($M_{XAI}$) for explainability, $$M_{XAI}, P_{XAI} \leftarrow \text{XAIPredictionProcess}(F_{TRAIN}, F_{TEST}) \quad (3)$$

As previously described, the automated XAI prediction process includes training a deep neural network (DNN)

model to compute relevance or contribution of each feature of the first set of features while generating the XAI predictions and the explainable model ($M_{XAI}$). The performing of the automated XAI prediction process in each iteration of the plurality of iterations is described already with reference to FIGS. 8-9 and further with reference to steps 1008-1014.

At 1008, the method 1006 includes processing, in a forward pass, the input data through calculations based on weights of edges of the DNN generated through random number generators to predict an output. At 1010, the output predicted in the forward pass is compared with an actual output obtained from the input data to obtain an error. The error is propagated back to update weights of the edges in a backward pass. Herein, propagating the error back facilitates in output prediction to be close to actual output by updating weights of edges in the DNN. The plurality of iterations are performed until a predetermined criteria associated with the error is met. In an embodiment, the predetermined criteria may include determination whether the predictions generated from original data based prediction process ($P_{PREDICT}$) and features based XAI prediction processes ($P_{XAI}$) are within a threshold difference. If the predetermined criteria is met, then the XAI relevance scores ($R_{XAI}$) are generated in subsequent steps. Alternatively, if the predetermined criteria is not met, then the features are enhanced through the feature engineering process and steps are repeated from equation 2 to 3. For example, on determination that the predetermined criteria is not met, the first set of features are enhanced in the subsequent iterations of the plurality of iterations to obtain a second set of features. Further the second set of features are processing through the automated XAI prediction process to generate the best suited explainable model ($M_{XAI}$) and the explainable artificial intelligence (XAI) predictions ($P_{XAI}$) until the predetermined criteria is met.

$$R_{XAI} \leftarrow XAIRelevanceScoresGenerationProcess(M_{XAI}, F_{TRAIN}, F_{TEST}) \quad (4)$$

At 1014, the method 1000 includes computing, in the backward pass, a relevance score based on the error value in the iteration when the predetermined criteria is met. The relevance score is indicative of the contribution of each feature from amongst the first or the second set of features using a layerwise relevance propagation of the each feature. The XAI output predictions obtained based on the relevance scores are used for generating natural language explanations for the XAI output predictions using known algorithms. The natural language explanations are converted to graphical form for displaying on the UI. At 1016, the method 1000 includes displaying the relevance score, the XAI output predictions and the XAI predictions on a user interface. In an example scenario, a table (Table. 1) is shown to include the example of different type of attributes values (such as loan, reason, DEROG, CLAGE, and so on) of the input data, their respective features (such a input attribute value, data type, feature name, feature value) and relevance scores (such as absolute feature relevance and relative feature relevance). Numeric and categorical values have their respective features, whereas text has got multiple categorical features extracted from it.

TABLE 1

Different type of attributes converted to features with relevance scores

| Input attribute name | Input attribute value | Data type | Feture name | Feature value | Absolute feature | Relative feature relevance (%) |
|---|---|---|---|---|---|---|
| LOAN | 2000 | Integer | LOAN | 2000 | 0 | 0 |
| REASON | Expansion | Categorical text | REASON | Expansion | 34.6866 | 8.27107 |
| DEROG | 0 | Categorical Numeric | DEROG | 0 | 53.6641 | 12.7963 |
| CLAGE | 216.9333333 | Floating number | CLAGE | 216.933 | 46.408 | 11.066 |
| NINQ | 1 | Categorical numeric to categorical text | NINQ | One | 52.7712 | 12.5834 |
| Content | The reserve bank of India (RBI) has warned Yes Bank Ltd of regulatory action for disclosyre of niladivergence report in violation of the confidentiality clause, the private sector lender said Friday. Yesbank, in a press release earlier this week, had said RBI has not found any divergence in the asset classification and provisioning done by the lender during 2017-18 | Unstructured text | Fraudulent activities | acquisitions | 16.828 | 4.01266 |
| | | | Financial health | negativenet_worth | 16.8527 | 4.01854 |
| | | | Legal | _week_low | 16.7983 | 4.00558 |
| | | | Operations | cyber_attacks | 0.97656 | 0.23286 |
| | | | Stock | Clearing_house_membership_suspended | 80.3877 | 19.1685 |
| | | | Public image | demonstration_outside_RBI | 100 | 23.8451 |

The system ensures richness of features in terms of calculating relevance scores or contributions of each feature. This process optimizes the relevance or contribution calculations based on input data, generated features, and their characteristics. In an example, embodiment, combined features based explanations may be generated using available explainability models/toolbox for machine learning, whereas detailed features based explanations are generated using SHAP algorithms FIG. 1110 is a block diagram of an exemplary computer system 1101 for implementing embodiments consistent with the present disclosure. The computer system 1101 may be implemented in alone or in combination of components of the system 202 (FIG. 2). Variations of computer system 1101 may be used for implementing the devices included in this disclosure. Computer system 1101 may comprise a central processing unit ("CPU" or "hardware processor") 1102. The hardware processor 1102 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 1102 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc. The processor 1102 may be a multi-core multi-threaded processor.

Processor 1102 may be disposed in communication with one or more input/output (I/O) devices via I/O interface 1103. The I/O interface 1103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1103, the computer system 1101 may communicate with one or more I/O devices. For example, the input device 1104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 1105 may be a printer, fax machine, video display (e.g., cathode ray tube (CRT), liquid crystal display (LCD), light-emitting diode (LED), plasma, or the like), audio speaker, etc. In some embodiments, a transceiver 1106 may be disposed in connection with the processor 1102. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1102 may be disposed in communication with a communication network 1108 via a network interface 1107. The network interface 1107 may communicate with the communication network 1108. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1108 may include, without limitation, a direct interconnection, local area network (LAN), wide area network (WAN), wireless network (e.g., using Wireless Application Protocol), the Internet, etc. Using the network interface 1107 and the communication network 1108, the computer system 1101 may communicate with devices 1109 and 1110. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 1102 may be disposed in communication with one or more memory devices (e.g., RAM 1113, ROM 1114, etc.) via a storage interface 1112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of programs or database components, including, without limitation, an operating system 1116, user interface application 1117, user/application data 1118 (e.g., any data variables or data records discussed in this disclosure), etc. The operating system 1116 may facilitate resource management and operation of the computer system 1101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1117 may facilitate display, execution, interaction, manipulation, or operation of program components through textual or graphical facilities. For example, user interfaces may provide computer interaction interface elements on a display system operatively connected to the computer system 1101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 1101 may store user/application data 1118, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, (the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Example Scenario:

The disclosed system is used for an example scenario of credit risk assessment. The input data at the system consist of a dataset consist of credit risk decision details, semi-structured dataset, binary classification severity vs non-severity of risk, structured part of data from databases, and unstructured part of data from news articles. In data ingestion process, data is identified to include binary classification of credit risk of corporate debtors. Out of 320 training instances, 168 were high severity risk customers and 152 non-severe risk customers. Out of 72 test instances 38 were high severity risk customers and 34 are non-severe risk customers.

During prediction process, deep learning neural network algorithm like Long Short-Term Memory (LSTM) or any traditional algorithms like Naïve Baye's, SVM, Decision Trees etc., may be utilized. Any AI/ML technique may be in use at client end. Given a profile classifies credit risk severity, the system vectorizes the customer profile's structured data and text by turning sequence of text into sequence of integers or vector for further processing.

The predicted data consist of binary classification of severity or non-severity of credit risk. Accuracy of prediction was around 96%.

HRM™ system was used for extracting features from the credit risk data. 11 Features were extracted. Respective keywords from the text data were extracted to support 6 features using HRM System, whereas 5 Features were created from preprocessing of the structured data.

For XAI prediction process, deep learning along with LSTM was used. Layer-wise Relevance Propagation (LRP) for Long Short-Term Memory (LSTM). LSTM was used as it works well of sequence of narrative text. Explainability was done using the Layer-wise Relevance propagation mechanism.

The XAI prediction data consists of binary classification of severity or non-severity of credit risk. Accuracy of Prediction was around 94%.

The relevance or contributions of all features were generated as absolute and relevant scores. Absolute scores were independent score out of 100% of individual feature, whereas relative score is score of individual feature out of 100% for all features combined. Actions can be triggered automatically, semi-automatically or manually based on predictions and its reasoning explained by Explainable AI system. An example of XAI relevance scores (including the absolute relevance score graph and the relative relevance score graph is illustrated in FIGS. #-#).

As another example, the system was used for Consumer Complaint Severity Prediction. the dataset consisted of consumer complaints, unstructured dataset, binary classification severe vs non-severe complaints, unstructured data is from customer's complaints. Data ingestion indicated that the data consists of binary classification of consumer complaints severity. Out of 320 training instances 152 were high severity customer complaints and 168 non-severe customer complaints. Out of 72 test instances 34 were high severity customer complaints and 38 were non-severe customer complaints.

Deep learning neural network algorithm like Long Short-Term Memory (LSTM) or any traditional algorithms like Naïve Baye's, SVM, Decision Trees etc. were used for prediction process. Any AI/ML technique may be in use at client end. Given a profile classifies consumer complaint's severity text by turning sequence of text into sequence of integers or vector for further processing. The predicted data consisted of binary classification of severity or non-severity of customer complaints. The accuracy of the prediction was around 90%. HRM™ system is used for extracting features from the customer complaints. 7 features were extracted from consumer complaint text using the HRM system. For XAI prediction, deep learning along with LSTM was used. LSTM was used as it works well of sequence of narrative text. Explainability was done using the Layer-wise Relevance propagation mechanism.

The XAI prediction data consisted of binary classification of severity or non-severity of the customer complaints. The accuracy of prediction was around 94%.

Relevance or contributions of all features were generated as absolute and relevant scores. Absolute scores were independent score out of 100% of individual feature. Actions can be triggered automatically, semi-automatically or manually based on predictions and its reasoning explained by Explainable AI system. An example of absolute relevance score in graphical form is illustrated in FIG. #.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for determining explainability of machine predicted decisions in an automatic manner. The disclosed system selects an explainability model based on the type of the input data and the type of problem (or model). For instance, if the prediction is done with the help of a DL model, then SHAP algorithm is appropriate to find out the explainability value for it. If some text is being predicted, then lime algorithm may be more appropriate for explainability. The disclosed system It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
receiving, via one or more hardware processors, an input data associated with a domain, the input data comprising one or more of textual data, structured data, unstructured data, and semi structured data;
processing, via the one or more hardware processors, the input data to obtain one or more predictions ($P_{PREDICT}$) and a first set of features of respective data types of the input data;
processing, via the one or more hardware processors, the first set of features through an automated XAI prediction process to generate an explainable model ($M_{XAI}$) and explainable artificial intelligence (XAI) predictions ($P_{XAI}$) in a plurality of iterations, wherein the automated XAI prediction process comprises training a deep neural network (DNN) model to compute relevance or a contribution of each feature of the first set of features while generating the XAI predictions and the explainable model ($M_{XAI}$), and wherein each iteration of the plurality of iterations comprises:
  processing, in a forward pass, the input data through calculations based on weights of edges of the DNN generated through random number generators to predict an output;
  comparing the output predicted in the forward pass with an actual output obtained from the input data to obtain an error;
  propagating back the error to update weights of edges in a backward pass, wherein propagating the error back facilitates in output prediction to be close to actual output by updating weights of edges in the DNN, and
wherein the plurality of iterations are performed until predetermined criteria associated with the error is met;
computing, in the backward pass, a relevance score based on the error in the iteration when the predetermined criteria is met, the relevance score indicative of the contribution of each feature from amongst the first set of features using a layerwise relevance propagation of the each feature, via the one or more hardware processors;
obtaining XAI output predictions based on absolute relevance scores of the features, wherein an absolute relevance score of the absolute relevance scores comprises an independent score of the feature indicating the contribution of each feature out of 100% maximum;
generating natural language explanations for the XAI output predictions;
converting the natural language explanations to a graphical form for displaying on a user interface (UI); and
displaying, via the one or more hardware processors, the relevance score, the XAI output predictions and the XAI predictions on the UI, wherein the XAI predictions based on relative relevance scores of the feature comprising a score of the feature from out of 100% for all the combined features.

2. The method of claim 1, wherein on determination that the predetermined criteria is not met, enhancing the first set of features in the subsequent iterations of the plurality of iterations to obtain a second set of features, and processing the second set of features through the automated XAI prediction process to generate the explainable model ($M_{XAI}$)

and the explainable artificial intelligence (XAI) predictions ($P_{XAI}$) until the predetermined criteria is met.

3. A system for determining explainability of machine predicted decisions, the system comprising:
a memory storing instructions;
one or more communication interfaces; and
one or more hardware processors coupled to the memory via the one or more communication interfaces, wherein the one or more hardware processors are configured by the instructions to:
receive an input data associated with a domain, the input data comprising one or more of textual data, structured data, unstructured data, and semi structured data;
process the input data to obtain one or more predictions ($P_{PREDICT}$) and a first set of features of respective data types of the input data;
process the first set of features through an automated XAI prediction process to generate an explainable model ($M_{XAI}$) and explainable artificial intelligence (XAI) predictions ($P_{XAI}$) in a plurality of iterations, wherein the automated XAI prediction process comprises training a deep neural network (DNN) model to compute relevance or a contribution of each feature of the first set of features while generating the XAI predictions and the explainable model ($M_{XAI}$), and wherein to perform each iteration of the plurality of iterations, the one or more hardware processors are configured by the instructions to:
process, in a forward pass, the input data through calculations based on weights of edges of the DNN generated through random number generators to predict an output;
compare the output predicted in the forward pass with an actual output obtained from the input data to obtain an error;
propagate back the error to update weights of edges in a backward pass,
wherein propagating the error back facilitates in output prediction to be close to actual output by updating weights of edges in the DNN, and
wherein the plurality of iterations are performed until predetermined criteria associated with the error is met;
compute, in the backward pass, a relevance score based on the error in the iteration when the predetermined criteria is met, the relevance score indicative of the contribution of each feature from amongst the first set of features using a layerwise relevance propagation of the each feature;
obtain XAI output predictions based on absolute relevance scores of the features, wherein an absolute relevance score of the absolute relevance scores comprises an independent score of the feature indicating the contribution of each feature out of 100% maximum;
generate natural language explanations for the XAI output predictions;
convert the natural language explanations to a graphical form for displaying on a user interface (UI);
display the relevance score, the XAI output predictions and the XAI predictions on the UI, wherein the XAI predictions based on relative relevance scores of the feature comprising a score of the feature from out of 100% for all the combined features.

4. The system of claim 3, wherein on determination that the predetermined criteria is not met, the one or more hardware processors are configured by the instructions to enhance the first set of features in the subsequent iterations of the plurality of iterations to obtain a second set of features, and process the second set of features through the automated XAI prediction process to generate the explainable model ($M_{XAI}$) and the explainable artificial intelligence (XAI) predictions ($P_{XAI}$) until the predetermined criteria is met.

5. One or more non-transitory machine-readable information storage mediums comprising one or more instructions which when executed by one or more hardware processors cause:
receiving an input data associated with a domain, the input data comprising one or more of textual data, structured data, unstructured data, and semi structured data;
processing the input data to obtain one or more predictions ($P_{PREDICT}$) and a first set of features of respective data types of the input data;
processing the first set of features through an automated XAI prediction process to generate an explainable model ($M_{XAI}$) and explainable artificial intelligence (XAI) predictions ($P_{XAI}$) in a plurality of iterations, wherein the automated XAI prediction process comprises training a deep neural network (DNN) model to compute relevance or a contribution of each feature of the first set of features while generating the XAI predictions and the explainable model ($M_{XAI}$), and wherein each iteration of the plurality of iterations comprises:
processing, in a forward pass, the input data through calculations based on weights of edges of the DNN generated through random number generators to predict an output;
comparing the output predicted in the forward pass with an actual output obtained from the input data to obtain an error;
propagating back the error to update weights of edges in a backward pass, wherein propagating the error back facilitates in output prediction to be close to actual output by updating weights of edges in the DNN, and
wherein the plurality of iterations are performed until predetermined criteria associated with the error is met;
computing, in the backward pass, a relevance score based on the error in the iteration when the predetermined criteria is met, the relevance score indicative of the contribution of each feature from amongst the first set of features using a layerwise relevance propagation of the each feature, via the one or more hardware processors;
obtaining XAI output predictions based on absolute relevance scores of the features, wherein an absolute relevance score of the absolute relevance score comprises an independent score of the feature indicating the contribution of each feature out of 100% maximum;
generating natural language explanations for the XAI output predictions;
converting the natural language explanations to a graphical form for displaying on a user interface (UI);
displaying the relevance score, the XAI output predictions and the XAI predictions on the UI, wherein the XAI predictions based on the relative relevance scores of the feature comprising a score of the feature from out of 100% for all the combined features.

6. The one or more non-transitory machine readable information storage mediums of claim 5, wherein on determination that the predetermined criteria is not met, enhancing the first set of features in the subsequent iterations of the plurality of iterations to obtain a second set of features, and processing the second set of features through the automated XAI prediction process to generate the explainable model ($M_{XAI}$) and the explainable artificial intelligence (XAI) predictions ($P_{XAI}$) until the predetermined criteria is met.

* * * * *